United States Patent
Bruno et al.

(10) Patent No.: US 6,377,379 B1
(45) Date of Patent: Apr. 23, 2002

(54) SYSTEM FOR INTERCHANGING OPTICAL SIGNALS OVER AN OPTICAL FIBER

(75) Inventors: Adrien Bruno, Palaiseau; Pascal Win, Maisons Alfort; Arnaud Rigny, Bagneux, all of (FR)

(73) Assignee: Alcatel (FR)

( * ) Notice: Subject to any disclaimer, the term of this patent is extended or adjusted under 35 U.S.C. 154(b) by 0 days.

(21) Appl. No.: 09/207,692

(22) Filed: Dec. 8, 1998

(30) Foreign Application Priority Data

Dec. 8, 1997 (FR) ............................................ 97 15477

(51) Int. Cl.$^7$ .............................................. H04B 10/12
(52) U.S. Cl. ......................... 359/173; 359/127; 385/24; 385/32
(58) Field of Search ................................ 359/124, 127, 359/130, 152, 154, 173; 385/24, 31, 32, 37, 39

(56) References Cited

U.S. PATENT DOCUMENTS

| | | | |
|---|---|---|---|
| 5,212,758 A | | 5/1993 | Adar et al. ............. 359/127 X |
| 5,440,416 A | * | 8/1995 | Cohen et al. ................ 359/127 |
| 5,483,369 A | * | 1/1996 | Darcie et al. ................ 359/126 |
| 5,818,991 A | * | 10/1998 | Maerz et al. .................. 385/50 |
| 5,999,290 A | * | 12/1999 | Li ............................... 359/127 |
| 6,125,219 A | * | 9/2000 | Bruno et al. ............. 359/127 X |

FOREIGN PATENT DOCUMENTS

| | | |
|---|---|---|
| EP | 0651530 | 5/1995 |
| EP | 0703473 | 3/1996 |

OTHER PUBLICATIONS

Mestric et al, "1.31–1.55 um Phased–Array Demultiplexer on InP", IEEE Photonic Tech. Letters, vol. 8, No. 5, May 1996.*

Francois et al, "Horizontal directional coupler filter suitable for integration in a 1.3+/1.3– um duplexer", Electronics Letters, vol. 31, No. 23, Nov. 1995.*

Li et al, "Demonstration and Application of a Monolithic two–PONs–in–one Device", 22nd Eur. Conf. on Optical Comm., pp. 123–126, 1996.*

Mestric R. et al: "Design and Fabrication of 1.31–1.55 $\mu$M Phased–Array Duplexer on InP" IEEE Journal of Selected Topics in Quantum Electronics, vol. 2, No. 2, Jun. 1996, pp. 251–256.

Amersfoort, M.R. et al: "High Performance 4–Channel Phasar Wavelength Demultiplexer Integrated With Photodetectors", Proceedings of the European Conference on Optical Communication, vol. 3, No. Conf. 19, pp. 49–52, Sep. 1993.

"Wavelength Locking Scheme Using a Grating Demultiplexer for Applications in WDMA Networks and WDM Links" IBM Technical Disclosure Bulletin, vol. 38, No. 5, pp. 413–415, May 1995.

* cited by examiner

*Primary Examiner*—Thomas Mullen
(74) *Attorney, Agent, or Firm*—Blakely Sokoloff Taylor & Zafman

(57) ABSTRACT

The invention relates to a system for interchanging optical signals over an optical fiber. The system comprises an optical component of the spectrograph type having an array of waveguides, an optical signal emitter and an optical signal receiver, a channel of one of the couplers of the optical component being connected to the optical fiber, a first channel and a second channel of the other coupler of the optical component being connected respectively to an inlet of the receiver and to an outlet of the emitter, and the said other coupler having a third channel connected to a port of another optical component of the system.

13 Claims, 7 Drawing Sheets

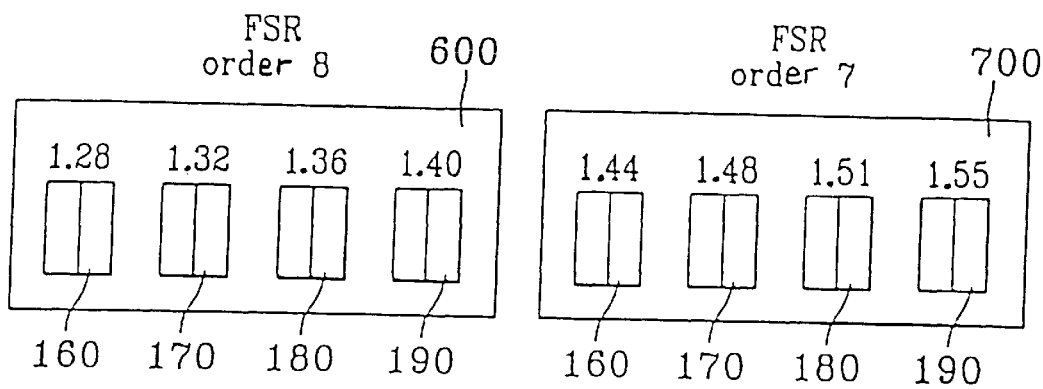
FIG. 7
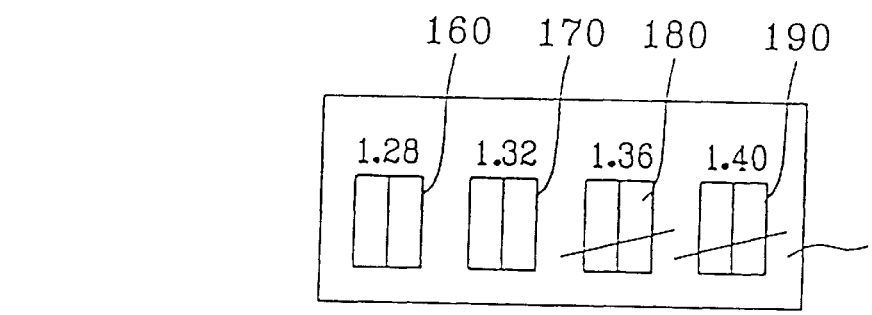
FIG. 8
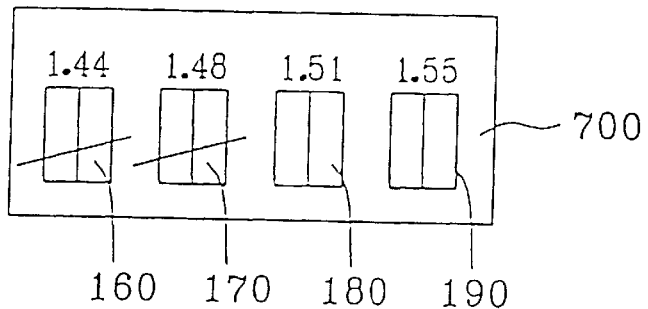
FIG. 9
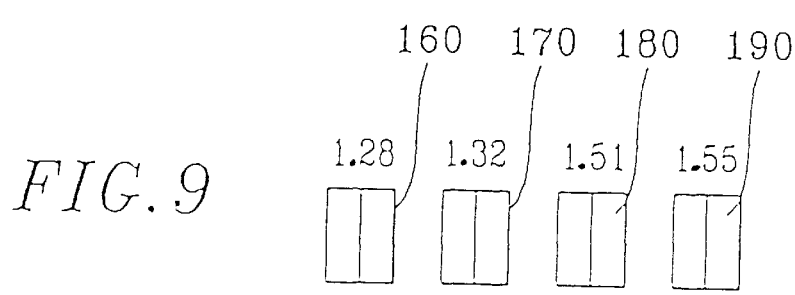

SYSTEM FOR INTERCHANGING OPTICAL SIGNALS OVER AN OPTICAL FIBER

The present invention relates to systems that simultaneously constitute both emitters and receivers of optical signals over an optical fiber.

BACKGROUND OF THE INVENTION

There is a desire at present to make use of optical fibers in ever more numerous and varied applications.

Thus, it is desired to be able to use a single optical fiber to convey signals of different kinds, such as telephone signals, television signals, or indeed signals carrying computer data. In conventional manner, the signals of different kinds conveyed in the same fiber are given different respective wavelengths so as to enable the signals to be distinguished from one another.

Thus, it is necessary to be able to use a single optical fiber to convey multiple signals simultaneously, including signals propagating in opposite directions, and it is necessary to be able to perform various different operations at an end of the optical fiber.

A first operation is controlling both-way communications over the optical fiber, such as a telephone call, for example.

A second operation is to separate various signals reaching said end, as a function of their wavelengths.

In addition to both-way communications, provision may be made at the end of the fiber to receive a plurality of signals of different wavelengths, such as, for example., a television signal and a signal carrying computer data.

A third operation is multiplexing various signals. This operation is necessary when it is desired to inject various signals of different kinds into the fiber.

For the first operation, proposals are made in "1.31–1.55 $\mu$m phase array demultiplexer on InP" by R. Mestric, H. Bissessur, D. Martin, and A. Pinquier, published in IEEE Photonic Technology Letters, Vol. 8, No. 5, May 1996, to use a spectrograph or "grating" comprising an array of waveguides (also known as a "phasar") that has an "inlet" channel on a first coupler and two "outlet" channels on a second coupler, and to connect the two "outlet" channels respectively to a laser and to a photodetector.

The inlet channel is connected to an optical fiber, and the role of the phasar is to inject into the fiber signals which the phasar receives on a first "outlet" channel, and to inject into its other "outlet" channel the signals it receives from the optical fiber.

That system is restricted to two wavelengths that are relatively far apart, i.e. equal to 1.33 $\mu$m and 1.55 $\mu$m, and it is not capable of separating wavelengths that are separated by differences of less than 0.04 $\mu$m, as would otherwise be desirable for both-way communications such as telephone calls.

Thus, that system cannot provide both-way communications at 1.28 $\mu$m and at 1.32 $\mu$m.

Concerning the first operation, proposals have also been made in "Horizontal directional coupler filter suitable for integration in a 1.3+/1.3– $\mu$m duplexer" by S. Francois, M. Filoche, F. Huet, S. Fouchet, G. Hervé-Gruyer, A. Ougazzaden, J. Brandon, N. Bouadma, M. Carré, and A. Carenco, published in Electronics Letters, Vol. 31, No. 23, Nov. 9, 1995, to make a meandering directional coupler enabling both-way communications to be managed in a telecommunications window situated around a wavelength of 1.3 $\mu$m. In order to separate two wavelengths respectively of 1.28 $\mu$m and 1.32 $\mu$m with good crosstalk between the arms of the coupler, use is made in that case of a Hamming function to vary a coupling coefficient along a propagation direction.

For systems that are small enough in size to be acceptable, directional couplers present the major drawback of being capable of achieving good crosstalk levels only over particularly narrow wavelength zones. For numerous applications requiring systems for interchanging optical signals, those systems therefore do not make it possible to work over wavelength zones that are sufficiently large.

Furthermore, those systems present the drawback of being particularly difficult to implement.

Concerning the second operation, it is known that a phasar can be used having an inlet channel connected to the optical fiber, and outlet channels connected to receivers where the phasar is adapted to separate signals of different wavelengths reaching the phasar via the fiber, and to deliver them to corresponding receivers connected to the various outlet channels.

Proposals have also been made in "Demonstration and application of a monolithic two-PONs-in-one device" by Yuan P. Li, L. G. Cohen, C. H. Henry, E. J. Laskowski, and M. A. Cappuzzo, of Lucent Technologies, Bell Laboratories, at the 22nd European Conference on Optical Communication, for a system comprising Mach-Zender type elements making it possible, starting from a multiwavelength signal comprising eight channels at 1.5 $\mu$m and one channel at 1.3 $\mu$m, to subdivide the 1.3 $\mu$m channel and to demultiplex the signals at 1.5 $\mu$m. That system has eight outlet fibers, each of which delivers a respective portion of the 1.3 $\mu$m signal together with one of the eight channels at 1.5 $\mu$m.

Mach-Zender type systems suffer from the same drawbacks as both-way couplers. They enable good cross-talk to be obtained only over particularly narrow wavelength zones, and they are particularly difficult to make.

Those various systems also suffer from the major drawback of performing only one of the three above-mentioned operations that may be necessary at one end of an optical fiber. Thus, at a given end of a fiber, they do not enable both-way communication to be provided simultaneously with wavelength separation of signals arriving over the fiber, or both-way communication with multiplexing of signals to be injected into the fiber.

For example, the simple systems that have been proposed in the past do not enable a single optical fiber to receive and emit telephone signals while simultaneously receiving a television signal.

OBJECTS AND SUMMARY OF THE INVENTION

An object of the present invention is to mitigate those various drawbacks and to provide a system that is simple to make, and that is suitable for performing those various operations at one end of an optical fiber.

According to the present invention, those objects are achieved by a system for interchanging optical signals over an optical fiber, the system comprising an optical component of the spectrograph type having an array of waveguides extending between two couplers, and channels extending from the couplers to the outside of the component, said system also comprising an optical signal emitter and an optical signal receiver, a channel of one of the couplers of the optical component being connected to the optical fiber, a first channel and a second channel of the other coupler of the optical component being respectively connected to an inlet of the receiver and to an outlet of the emitter, wherein said other coupler has a third channel connected to a port of another optical component of the system.

BRIEF DESCRIPTION OF THE DRAWINGS

Other characteristics, objects, and advantages of the present invention appear on reading the following description and inspecting the accompanying drawings, given as non-limiting examples and in which:

FIG. 7 shows a geometrical disposition of outlet channels relative to various free spectrum ranges existing in a four-channel outlet coupler of a phasar of the invention;

FIG. 8 shows the same geometrical disposition in which the free spectrum ranges are shown one above the other;

FIG. 9 shows the outlet channels of FIGS. 7 and 8 placed on an axis that represents their real positions in the outlet coupler;

DETAILED DESCRIPTION

Figure 1:
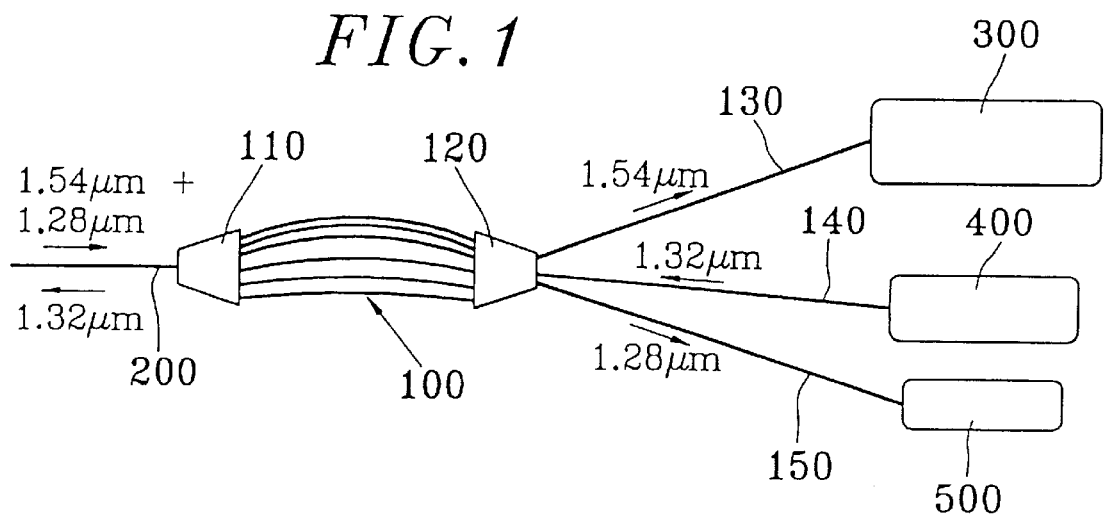
FIG. 1 shows the general structure of a system of the present invention.

FIG. 1 is an overall view of an optical communications system of the invention. The central portion of FIG. 1 shows a phasar 100. The phasar has an inlet coupler 110 connected to an optical fiber 200.

By way of example, the optical fiber 200 is connected to a local optical telecommunications network, with the overall system of FIG. 1 being located in a dwelling. The FIG. 1 system is connected via the local network, for example, to a telephone exchange, to a center for broadcasting television signals, or indeed to computers situated in other dwellings.

Thus, the fiber 200 is designed to have optical signals travelling simultaneously therealong in opposite directions.

The phasar 100 has a second coupler 120. The coupler 120 has three channels going out from the phasar.

A first channel 130 connects the coupler 120 to a multi-channel receiver 300. The receiver 300 is adapted to receive signals at wavelengths close to 1.54 µm.

A second channel 140 connects the coupler 120 to an optical signal emitter 400 which emits optical signals at a wavelength equal to 1.32 µm.

A third channel 150 connects the coupler 120 to a second receiver 500 which is adapted to receive signals at a wavelength of 1.28 µm.

The inventors have discovered that by making a phasar 100 capable of wavelength-division multiplexing or demultiplexing of at least three signals having three respective different wavelengths, it is possible to use such a phasar to inject into an optical fiber 200 a signal that has a first one of said three wavelengths, while simultaneously separating two other signals, said other two signals reaching the phasar 100 via the optical fiber 200 and having the other two of said three wavelengths.

Thus, in the embodiment described herein, two optical signals, one at 1.28 µm and the other at 1.54 µm, arrive simultaneously at the coupler 110 via the fiber 200. These two signals are separated by wavelength in the phasar 100 and they are delivered respectively to the receiver 300 and to the receiver 500 via the channels 130 and 150. Simultaneously, the emitter 400 emits a signal at 1.32 µm over the channel 140 and the phasar 100 delivers said signal at 1.32 µm over its array of wave-guides and the coupler 110 to the optical fiber 200.

More generally, a phasar of conventional type, suitable for separating a number n of different signals, where $\underline{n}$ is greater than 3, all arriving on one channel of an inlet coupler over an optical fiber, said signals having respective wavelengths $\lambda_1, \ldots, \lambda_n$, and suitable for delivering said $\underline{n}$ different signals via $\underline{n}$ outlet channels of an outlet coupler, can be connected via said outlet channels to a set of components comprising a multiplicity of emitters and receivers, each suitable for emitting or receiving a signal at a wavelength corresponding to the channel via which it is connected to the outlet coupler of the phasar. The inventors have discovered that such a system enables the emitters and the receivers to emit and receive signals at their respective wavelengths over the phasar and the optical fiber without said signals interfering with one another, whether in the phasar or in the optical fiber. In addition, these emitters and receivers can respectively emit and receive signals simultaneously.

In the embodiment of FIG. 1, each of the three elements constituted by the receiver 300, the emitter 400, and the receiver 500, receives or emits an optical signal at a wavelength specific thereto.

The local network brings an incoming signal to the phasar 100 via the fiber 200, which incoming signal is made up of two signals at wavelengths respectively equal to the reception wavelengths of the receivers 300 and 500, i.e. of 1.54 µm and 1.28 µm.

At all times, the phasar separates this incoming signal into these two signals having the wavelengths of the two receivers 300 and 500, with said separate signals being delivered to the corresponding receivers 300 and 500.

In this embodiment, the receiver 500 and the emitter 400 serve to provide both-way communication over the fiber 200.

In other words, the phasar 100 provides both-way communication between the local network and the assembly constituted by the emitter 400 and the receiver 500.

Simultaneously, the phasar 100 receives a signal at 1.32 µm from the emitter 400 and injects said signal into the fiber 200 going away from the phasar 100.

Thus, when the signals delivered over the channels 140 and 150 are telephone signals, the receiver 500 and the emitter 400 are connected respectively to a loudspeaker and to a microphone of a telephone, and it is possible for a user to send a message by speaking into the microphone while listening to speech from a distant party in the loudspeaker.

The phasar simultaneously extracts from the optical fiber 200 a signal at the wavelength specific to the receiver 300, i.e. 1.54 μm.

In an embodiment of the invention, the signal at 1.54 μm as received by the phasar 100 is a television signal, and the receiver 300 is a television set. The phasar then simultaneously separates the telephone signal at 1.28 μm from the television signal at 1.54 μm and injects the telephone signal at 1.32 μm into the fiber 200, thus making it possible to hold a telephone conversation while the television is in operation.

In a variant of the invention, the receiver 300 is replaced by an emitter, e.g. an emitter of television signals, or a computer transmitting computer data.

Here also, the inventors have discovered that by adopting a phasar of the type suitable for separating signals of wavelengths corresponding respectively to those of the receiver and of two emitters for connecting to the end of the fiber 200, it is possible simultaneously to multiplex the signals applied to the phasar 100 by the two emitters, and to inject said multiplexed signals into the optical fiber 200, while simultaneously extracting a signal reaching the phasar 100 via the fiber 200 and delivering that signal to the receiver.

This variant of the invention is particularly adapted to a center for emitting television signals, for example.

In the particular example of FIG. 1, the phasar 100 emits a signal at 1.32 μm into the optical fiber and receives from the optical fiber 200 signals at wavelengths of 1.28 μm and 1.54 μm.

Naturally, the invention is not limited to these three wavelength values.

In numerous applications, it is necessary to work in distinct wavelength windows, depending on the kinds of signal. Thus, for telephone signals, the presently adopted window is a narrow window situated around 1.3 μm. Telephone signals travelling in opposite directions in an optical fiber are preferably at wavelengths of 1.28 μm and 1.32 μm, whereas computer or television type signals are preferably at a wavelength close to 1.5 μm.

In such applications, it is necessary to make a phasar capable of separating three signals, where the first two signals are of wavelengths that are very close together, in this case wavelengths separated by 0.04 μm, and a third signal whose wavelength is considerably further away from those of the first two signals, as in this case a signal which is at a distance of about 0.2 μm from the first two signals.

There follows a description of a phasar of the invention that enables such signals to be separated. In this embodiment, the signals to be separated are at wavelengths equal to 1.28 μm, 1.32 μm, and 1.54 μm.

In a conventional phasar, suitable for separating three signals of different wavelengths, three channels are available at the outlet from the outlet coupler, each suitable for conveying a separate one of the signals. Each pair of channels taken from the three channels has two channels that are physically spaced apart by a distance proportional to the difference between the wavelengths conveyed by each of the two channels in the pair. Thus, in a conventional phasar, the greater the wavelength difference between the signals conveyed by two channels, the further apart said channels are located on the outlet coupler.

When two of the three wavelengths to be separated are very close together, while the third wavelength is very far from the first two, a phasar of conventional type ends up with two channels that are very close together on its outlet coupler and another channel that is far away from the first two channels.

In addition, it is necessary to guarantee some minimum spacing between any two outlet channels from a coupler, generally because of constraints associated with the technology used for making the channels. Assuming that this minimum spacing is complied with for the two channels corresponding to the two-close-together wavelengths, and assuming that the spacing between a pair of channels is proportional to the difference between the wavelengths to be conveyed via those channels, then a third channel corresponding to a wavelength that is far away must be located so as to be spaced apart from the first two channels by a spacing that becomes increasingly large with any increase in the size of the minimum physical spacing between the first two channels.

Thus, in a conventional phasar, it is necessary to place the first two channels on a first side of an expansion zone of the coupler and to place the third channel far away from the first two, on a side opposite from said expansion zone.

Unfortunately, it is conventional for light energy to be distributed non-uniformly over the outlet coupler of a phasar.

Thus, in general, a difference of intensity is observed between a central portion of a coupler expansion zone and a side portion thereof. A channel disposed at the center of the outlet coupler of a phasar conveys light of higher intensity than a channel disposed on one side thereof. This difference in intensity between the center and the side of a coupler is typically 1 dB to 2 dB.

It is thus most disadvantageous, in terms of energy transmission, to place a channel in a side portion of a coupler.

The phasar of the invention, as described below, enables outlet channels corresponding to non-uniformly distributed wavelengths such as 1.28 μm, 1.32 μm, and 1.54 μm to be brought together around the center of the expansion zone of an outlet coupler. Such a phasar thus makes it possible to recover a maximum amount of light intensity on all of its outlet channels.

Figure 2:
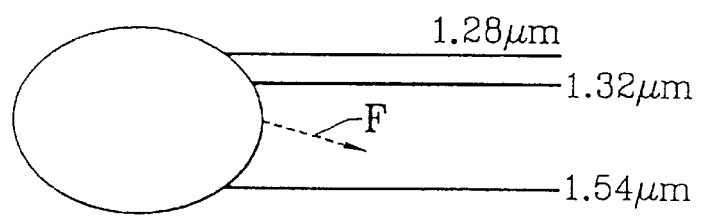
FIG. 2 shows an outlet coupler of the prior art.

FIG. 2 shows an outlet coupler of a conventional phasar, having outlet channels corresponding to 1.28 μm, 1.32 μm, and 1.54 μm that are distributed over the outlet of the coupler. FIG. 2 also shows a dashed-line arrow F corresponding to a direction of maximum light intensity within the coupler.

Figure 3:
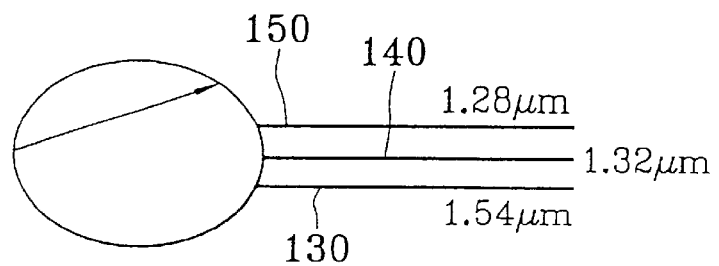
FIG. 3 shows an outlet coupler of the invention.

FIG. 3 shows an outlet coupler of a phasar of the invention.

As can be seen, the outlet channels corresponding to wavelengths of 1.28 μm, 1.32 μm, and 1.54 μm are grouped together in the center of the coupler.

The phasar 100 of the invention is made by adopting lengths for the waveguides in the array of the phasar that are distributed so as to obtain two orders of interference within the outlet coupler 120. Thus, within the outlet coupler 120, two free spectrum ranges of different center wavelengths are obtained. More precisely, by selecting an appropriate distribution of waveguide lengths within the array, it is possible to place within the outlet coupler 120 two different free spectrum ranges having respective center wavelengths close to the wavelengths that are to be separated.

In the example described above, the center wavelengths are close respectively to 1.3 μm and to 1.5 μm.

A method of determining a distribution of waveguide lengths is described below so as to obtain two spectrum ranges of selected center wavelengths within the outlet coupler 120.

Once two center wavelengths have been adopted, two outlet channels are placed at the outlet of the outlet coupler 120 so as to convey the wavelengths 1.28 μm and 1.32 μm, with these two first wavelengths belonging to a first free spectrum range, and one outlet channel is placed in such a manner as to convey a wavelength of 1.54 μm, which wavelength belongs to a second free spectrum range. Since each of these wavelengths is close to a center wavelength of a free spectrum range, the channels are located in the central portion of the coupler. In the particular example described herein, the phasar of the invention operates at order 8 for the wavelengths 1.28 μm and 1.32 μm and at the next lower order, i.e. at order 7 for the wavelength of 1.54 μm.

Two free spectrum ranges are superposed in the outlet coupler, so each of the three channels is suitable for receiving a wavelength belonging to a first free spectrum range and a wavelength belonging to a second free spectrum range.

Figure 4:
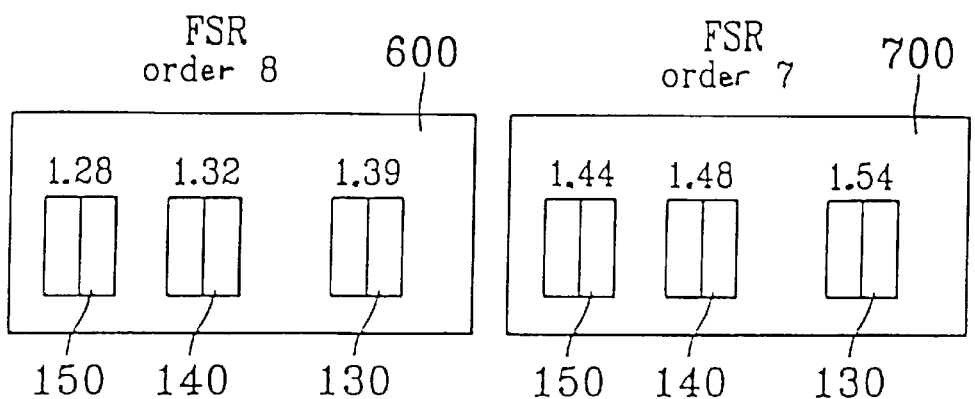
FIG. 4 shows a geometrical disposition of outlet channels relative to various free spectrum ranges located in a three-channel outlet coupler of a phasar of the invention.

In FIG. 4, each of the outlet channels 130, 140, and 150 corresponding to the channels of FIG. 1 is represented by a rectangle having a center marked by a vertical line. In FIG. 4, each of the three channels is shown twice over. A first time within a rectangle 600 representing a first free spectrum range corresponding to order 8, and a second time inside a rectangle 700 representing a second free spectrum range corresponding to order 7. A wavelength value is written above each rectangle that represents a channel. This value is the wavelength that the phasar is capable of separating and delivering to the channel in question, within the free spectrum range under consideration. Thus channel 150 is positioned at the outlet of the coupler 120 in such a manner as to receive a wavelength of 1.28 μm in the first free spectrum range 600, and a wavelength of 1.44 μm in the second free spectrum range 700. Similarly, the channel 140 is positioned so as to receive, in the first free spectrum range 600, the wavelength 1.32 μm, and in the second free spectrum range 700, the wavelength 1.48 μm. Finally, the channel 130 is positioned so as to receive in the first free spectrum range 600, a wavelength of 1.39 μm, and in the second free spectrum range 700, a wavelength of 1.54 μm. The channels 130, 140, and 150 are spaced apart in FIG. 4 in a manner that is proportional to the real spacing they have at the outlet of the coupler 120.

Figure 5:
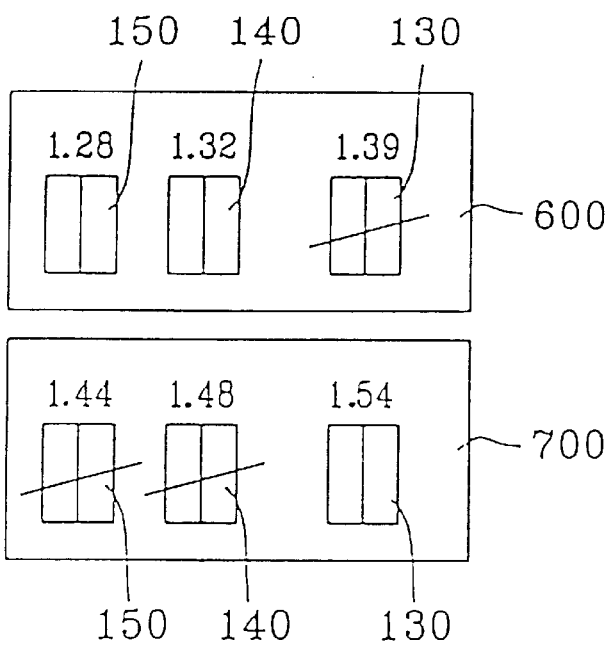
FIG. 5 shows the same geometrical disposition in which the free spectrum ranges are shown one above another.

In FIG. 5, the free spectrum ranges 600 and 700 are shown one above the other, and within these free spectrum ranges 600 and 700, each of the channels 130, 140, and 150 can be seen.

For each of the channels 130, 140, and 150, one of the two rectangles representing the channel has been crossed out by a sloping line. When a rectangle is crossed out in this way, then the wavelength which this channel is suitable for conveying within the free spectrum range under consideration is of no particular interest in the application described.

In the embodiment of FIG. 1, the signals conveyed over the optical fiber 200 occupy only three wavelengths, namely 1.28 μm, 1.32 μm, and 1.54 μm. Thus, the channel 130 is crossed out in free spectrum range 600. The receiver 300 connected to the second coupler via channel 130 will only receive a signal of wavelength 1.54 μm, since there is no signal at 1.39 μm passing through the system as a whole. The wavelength which the system will also pass in the first range 600 is therefore of no importance.

The same applies to the channels 140 and 150 since, for each of these channels, one of the wavelengths they are adapted to convey does not occur within the system of FIG. 1, and in particular is not conveyed by the fiber 200.

Thus, each channel is placed in the coupler on the basis of only one free spectrum range, i.e. the free spectrum range of center wavelength that is closer to the wavelength which the channel is to convey. Thus, the channels 140 and 150 are positioned on the basis of the center wavelength which is close to 1.3 μm, i.e. on the basis of the disposition of the first free spectrum range. Conversely, the channel 130 that is to convey a wavelength of 1.54 μm is placed in the coupler 120 solely on the basis of the center wavelength of the second free spectrum range, i.e. the range corresponding to wavelengths close to 1.5 μm.

Figure 6:
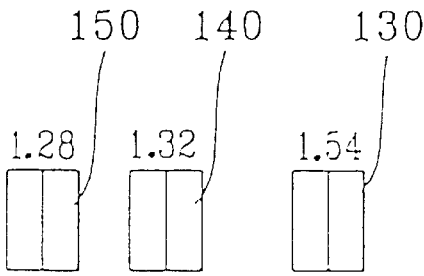
FIG. 6 shows the outlet channels of FIGS. 4 and 5 disposed on an axis representing their real positions in the outlet coupler.

In FIG. 6, the channels 130, 140, and 150 are placed on an axis X with mutual spacing that is proportional to their real spacing in the outlet coupler 120. As can be seen in FIG. 6, the spacing between the channels 140 and 150 is substantially equal to the spacing between the channels 140 and 130.

In a variant of the invention, as shown in FIGS. 7 to 9, four outlet channels are again adopted for the outlet coupler 120. In this variant, a distribution of waveguide lengths within the array is adopted to enable two free spectrum ranges 600 and 700 to be obtained in the outlet coupler 120. In this variant, the outlet channels are referenced 160, 170, 180, and 190. In the same manner as in the preceding embodiment, the two free spectrum ranges 600 and 700 have center wavelengths that are close respectively to 1.3 μm and to 1.5 μm.

The channels 160 and 170 are placed in the outlet coupler 120 on the basis of the exact center wavelength of the first free spectrum range 600, which center wavelength is close to 1.3 μm. Given this center wavelength, the channel 160 is spaced apart from the center of the coupler 120 by a distance which corresponds to the wavelength difference between 1.28 μm and the center wavelength of the first free spectrum range 600. Similarly, the channel 170 is placed at a distance from the center of the coupler 120 which corresponds to the difference between 1.32 μm and the center wavelength of the first free spectrum range.

Similarly, the channels 180 and 190 are placed at the outlet of the outlet coupler 120 at distances from the center of the outlet coupler 120 that are determined as a function of knowing the center wavelength of the second free spectrum range 700 so that these channels respectively receive wavelengths equal to 1.51 μm and 1.55 μm.

As can be seen in FIG. 7, after the outlet channels have been placed in this way, the channels 160 and 170 are suitable for receiving in the second free range 700 respective wavelengths of 1.44 μm and 1.48 μm. Since the wavelengths 1.44 μm and 1.48 μm do not occur in the system, they are not delivered to the channels 160 and 170, and they are therefore crossed out in FIG. 8.

Similarly, the channels 180 and 190 are suitable for receiving the wavelengths 1.36 μm and 1.40 μm from the first free spectrum range 600, however they do not deliver these wavelengths because the signals conveyed over the optical fiber 200 do not contain signals at these wavelengths.

FIG. 9 shows the four channels 160, 170, 180, and 190 spaced apart along an axis X representing the positioning of the channels in the outlet coupler. The spacing between these channels in FIG. 9 is proportional to the real spacing between these channels at the outlet of the outlet coupler, so it can be seen from FIG. 9 that the spacing between any two consecutive channels is substantially identical.

The phasar of the invention is, in practice, suitable for delivering over each channel 160, 170, 180, 190 signals of wavelengths lying in a narrow range of wavelengths around the wavelength selected for the channel. The fact that two channels 180 and 190 are placed so that one conveys signals around 1.51 μm and the other conveys signals around 1.55 μm makes it possible to convey all signals of wavelengths situated around 1.54 μm over the two channels 180 and 190 taken together, and more precisely wavelengths lying anywhere in a window covering the range 1.51 μm to 1.55 μm, at least.

In this case, two channels 180 and 190 have been selected with wavelengths that are spaced apart by 40 nm. It would also have been possible, for example, to select two channels that are of wavelengths spaced apart by 20 nm.

Providing wide coverage for a window situated around 1.54 μm is particularly advantageous when the phasar 100 is connected to a receiver 300 by the two channels 180 and 190, and the phasar separates and delivers to the receiver 300 via the two channels 180 and 190 a multi-channel signal, i.e. a channel made up of a plurality of signals at different wavelengths lying within the window around 1.54 μm. Thus the signal separated out by the phasar 100 may contain both a television signal and a signal that carries computer data.

It would then be possible to provide as the receiver 300, or downstream therefrom, a separator system, e.g. of the phasar type.

In general, it will be understood that the advantage of working on two different orders, e.g. order 8 for channel around 1.3 μm and order 7 for channels around 1.54 μm, is that it makes it possible to bring together two widely separated wavelength zones of the expansion zone of the coupler and apply them to three waveguides that are close to one another.

More precisely, an outlet channel is constituted by an epitaxially-grown strip having a width of 2 μm. Conventional photolithography makes it possible to obtain a minimum transverse separation between two adjacent edges of consecutive waveguides that is equal to 0.85 μm. Thus the minimum transverse spatial separation between the center axes of two outlet channels is equal to twice the half-width of a waveguide plus the minimum separation possible between the edges of the waveguides, i.e. 2.85 μm.

When the channels corresponding to wavelengths of 1.28 μm and 1.32 μm are separated in this way by 2.85 μm, it would be necessary in a conventional coupler that is to obtain a wavelength of 1.54 μm on a third channel to place the third channel at a distance of 15.675 μm from the channel operating at 1.32 μm. The ratio 2.85/15.675 is equal to the ratio between the wavelengths differences (1.32–1.28)/(1.54–1.32).

In the context of the present invention, it is not necessary to keep the spacing between the channels proportional to the differences between the wavelengths of the channels. By locating the channel at 1.54 μm relative to the center of a spectrum range which is different from the spectrum range corresponding to the first two channels, it is possible to locate the third channel at a distance of 2.933 μm from the channel at 1.32 μm.

In practice, the phasar 100 of FIGS. 1, 4, 5, and 6 has an outlet coupler 120 whose outlet channels are located relative to the center of the coupler at algebraic distances of −1.425 μm, +1.425 μm, and +4.358 μm respectively for the channels at 1.28 μm, 1.32 μm, and 1.54 μm. These locations are determined on the assumption that light enters and leaves the coupler 110 via an inlet channel located at the center of the coupler 110.

These locations are also determined for a phasar 100 whose main parameters are a focal length for the expansion zones of 80 μm, a difference in length between consecutive waveguides in the array of 3.206 μm, and the number of waveguides being 20.

There follows a description of how to determine a difference of length between consecutive waveguides for the array in such a manner as to obtain two free spectrum ranges in the outlet coupler, each of said two spectrum ranges having a selected center wavelength.

In conventional manner, an interference order $\underline{m}$ of a phasar is associated with the center wavelength λ of the free spectrum range corresponding to said order $\underline{m}$, i.e. to the wavelength λ of the signals transmitted to the center of said outlet coupler, by the equation m.λ=n.D1 where $\underline{n}$ is the refractive index of the waveguides of the phasar array and D1 is a constant length difference between two consecutive waveguides of the array. Thus, in order to obtain two free spectrum ranges in the expansion zone of the outlet coupler 120, it is necessary to select a value for D1 that satisfies the following two equations: $m_1\lambda_1 = n.D1$ and $m_2\lambda_2 = nD1$, where $\lambda_1$ and $\lambda_2$ are the desired center wavelengths for the two free spectrum ranges occurring in the outlet coupler, and where $m_1$ and $m_2$ are two different interference orders, i.e. two different integer numbers.

Thus, $m_1$, $m_2$, $\lambda_1$, and $\lambda_2$ must satisfy the equation: $m_1\lambda_1 = m_2\lambda_2$, where $\lambda_1$ and $\lambda_2$ must be close respectively to 1.3 μm and 1.5 μm. The equation $m_1/m_2 = \lambda_2/\lambda_1$ must therefore be satisfied so that $m_1/m_2$ must be close to 1.5/1.3.

A ratio of integers close to this value is 8/7. Thus, two interference orders are adopted: order 8 for $m_1$ and order 7 for $m_2$. It is then possible to select two center wavelengths $\lambda_1$ and $\lambda_2$ that satisfy $\lambda_2/\lambda_1 = 8/7$, while ensuring that $\lambda_2$ is close to 1.5 μm and $\lambda_1$ is close to 1.3 μm.

Once these two wavelengths have been selected, and given the value of the refractive index $\underline{n}$, the equation $m_1\lambda_1 = n.D1$ or the equation $m_2\lambda_2 = n.D1$ makes it possible to determine the length difference D1 required between two consecutive waveguides in the array in order to obtain these two center wavelengths $\lambda_1$ and $\lambda_2$.

In this case, we obtain a value for D1 which is equal to 3.2 μm. Naturally, it is possible to adopt other interference orders that also make it possible to obtain a ratio $\lambda_2/\lambda_1$ compatible with values of $\lambda_2$ and $\lambda_1$ close to 1.5 μm and 1.3 μm respectively. Thus, it is possible to adopt lower interference orders. Under such circumstances, the free spectrum range obtained for reach order is wider in terms of wavelength, which means that the focal length of the expansion zones need to be increased and thus that the size of the system needs to be increased.

In known manner, using a large number of waveguides in the array makes it possible to obtain good crosstalk at the outlet from the phasar.

A known method of obtaining good crosstalk is to adopt a length difference between consecutive waveguides in the array that is small. This is equivalent to adopting low interference orders. Thus, in a conventional phasar, it is possible to adopt an interference order equal to 2, for example, so as to reject adjacent additional lobes to outside a wavelength zone of the outlet coupler by increasing the wavelength width of the channels.

Such adjacent lobes appear within the outlet coupler at higher orders.

For a phasar adapted to separate signals having wavelengths that are not uniformly distributed, such as 1.28 μm, 1.32 μm, and 1.54 μm, it is necessary to obtain crosstalk of particularly good quality and the orders are determined by the wavelengths selected for the centers of the free spectrum ranges.

It is therefore necessary to improve crosstalk by placing a particularly large number of waveguides in the array.

Using a large number of waveguides makes it possible to reduce the size of the secondary lobes, even though the adjacent secondary lobes continue to lie within the free spectrum range.

The invention proposes a geometrical disposition for the array of the phasar that makes it possible to adopt a particularly high number of waveguides in the array.

Naturally, the ambit of the invention is not limited solely to the case where good quality crosstalk is required. Such a disposition for the waveguides of the array turns out to be particularly suitable whenever it is necessary or advantageous to have a large number of waveguides in the array, or to locate the waveguides in a disposition that occupies a particularly small amount of space. A phasar of the invention is also particularly advantageous when it is necessary to make an array of waveguides in which the difference of length between consecutive waveguides is particularly small, and constant.

Figure 10:
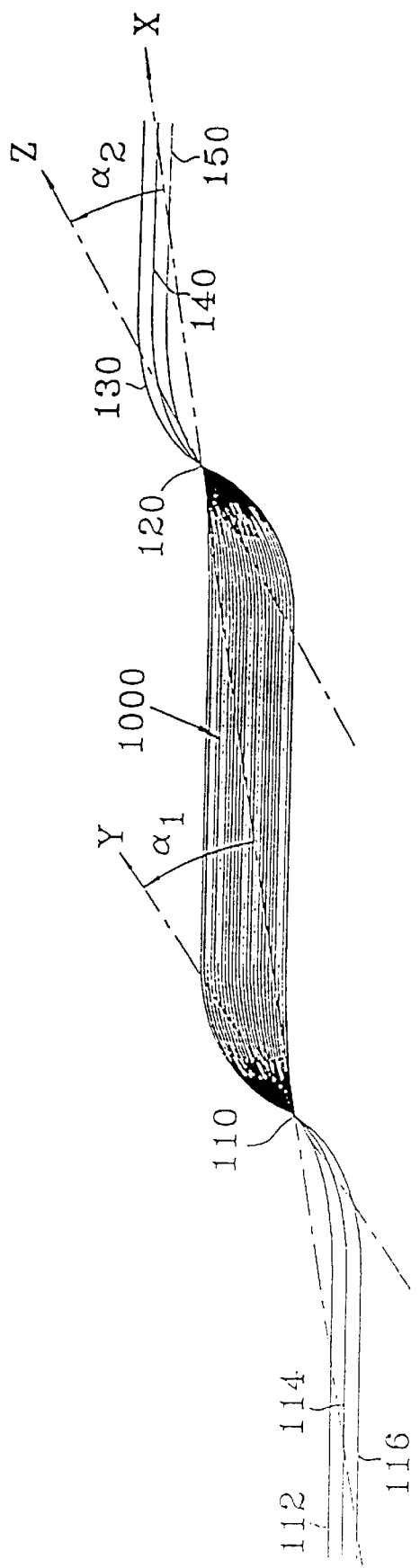
FIG. 10 is a side view of a phasar showing one particular geometrical configuration for its array of waveguides in accordance with the invention.

FIG. 10 shows a phasar of the invention corresponding to the phasar of FIG. 1. The inlet coupler 110 has three inlet channels 112, 114, and 116, and the outlet coupler 120 has three outlet channels 130, 140, and 150. These three inlets are separated from the three outlets by two free expansion zones acting as lenses, and by an array of waveguides 1000. Only the inlet waveguide 114 is used in the application described herein.

In a variant of the invention, a phasar is proposed whose couplers, likewise symmetrical to each other, have respectively five inlet channels and five outlet channels. Thus, if one of the waveguides becomes unusable, another waveguide can be used to replace the unusable waveguide.

As can be seen in FIG. 10, the array 1000 is of an undulating shape.

A general axis X is defined as passing through the centers of the respective couplers 110 and 120, and two main-directions of the waveguides of the array 1000 are defined in the respective vicinities of the couplers 110 and 120.

These main directions are defined as follows. Consideration is given to the tangents to the waveguides of the array 1000 at the points where waveguides are connected to a given coupler, and a mean direction of said tangents is plotted. The mean direction of the waveguides at the coupler under consideration is defined as being the mean direction of the tangents.

In FIG. 10, two axes Y and Z are plotted corresponding to the orientations of the main directions of said waveguides at the couplers 110 and 120, respectively.

FIG. 10 also defines a positive direction along the axis λ. This positive direction is defined by an arrow going from the coupler 110 towards the coupler 120.

On each of the axes Y and Z, a positive direction is defined as follows. Since the coupler 110 is arbitrarily defined as being the inlet coupler, the positive direction along the axis Y of the inlet coupler 110 is defined as being the direction in which the waveguides depart from said inlet coupler 110. Conversely, the positive direction of the axis Z of the outlet coupler 120 is defined as the direction in which the waveguides arrive at the outlet coupler 120.

It is then possible to define two algebraic angles $\alpha_1$, and $\alpha_2$. The angle $\alpha_1$, is the directed algebraic angle defined using ordinary mathematical rules, starting from the directed general axis X and going to the directed axis Y. Similarly, the angle $\alpha_2$ is the directed algebraic angle starting from the directed axis X and going to the directed axis Z.

It can be seen in FIG. 10 that the angles $\alpha_1$ and $\alpha_2$ have the same sign. In other words, the waveguides of the array emerge from the coupler 110 in a general direction Y that goes upwards in FIG. 10 while the waveguides of the array emerge from the outlet coupler 120 in a direction that goes downwards in the figure. One of the couplers 110 and 120 is therefore upwardly inclined and the other downwardly inclined.

After emerging from the coupler 110, the waveguides describe a first curve so that, in a central portion of the array, the tangents of the waveguides pass from an upward inclination to a horizontal direction. In the central portion of the array, the waveguides are rectilinear and mutually parallel. On coming close to the coupler 120, the waveguides of the array describe another curve, this time with curvature opposite to that of the first curve, causing them to go from a horizontal orientation to a new upwardly inclined orientation.

Thus, each waveguide of the array 1000 describes an S-shape and the geometry of the system remains unchanged if the system is rotated through 180° about a central axis thereof. More precisely, each waveguide of the array 1000 describes a first bend having a first direction of curvature, then a rectilinear length, and finally a second bend having a second direction of curvature opposite to the first direction of curvature.

Each waveguide of the array 1000 describes a bend of high curvature and a bend of low curvature. The waveguides of the array in low positions in FIG. 10 are on the inside of the first bend of the array and on the outside of the second bend. They therefore present low curvature in the first bend and higher curvature in the second bend. Conversely, the waveguides disposed in a high position in the array describe the first bend on the outside thereof and the second bend on the inside thereof.

This disposition for the array, and in particular for the couplers, makes it possible firstly to locate a very large number of waveguides in the array, and makes it possible secondly to adopt particularly small differences of length between waveguides. A disposition with couplers that are inclined relative to the general axis X at respective angles $\alpha_1$ and $\alpha_2$ that are equal thus makes it possible to dispose a particularly large number of waveguides having the same length.

In previously-known array dispositions, the main directions of the couplers coincide, or the main directions of the couplers are inclined relative to a general axis of the array at angles $\alpha_1$ and $\alpha_2$ defined as stated above which have opposite signs.

In such configurations, a difference in length between two consecutive waveguides of the array, however small this difference in length might be, gives rise to transverse spacing between two waveguides of the array in the center of the array, which spacing is often much larger than the minimum transverse spacing that it is technologically possible to achieve.

By using the above-described disposition, it is possible to place the waveguides of the array with transverse spacing between consecutive waveguides that is particularly small, or even at the minimum possible value.

In a disposition as shown in FIG. 10, a small difference between the angles $\alpha_1$ and $\alpha_2$, e.g. an angle $\alpha_2$ slightly greater than the angle $\alpha_1$, makes it possible to obtain an array of waveguides in which the lower the position of the waveguide in the array, the longer the waveguide. While maintaining transverse spacing between pairs of waveguides in the array that is particularly small, and while using a number of waveguides that is particularly high, each length difference Dl between consecutive waveguides corresponds to an angle difference $(\alpha_2-\alpha_1)$ that enables said difference in length Dl to be obtained.

Furthermore, since the transverse spacing between two waveguides of the array can be selected to be particularly small, the phasar 100 of the invention can have a large number of waveguides in the array without occupying too great a transverse volume in the central portion of the array.

Figure 11:
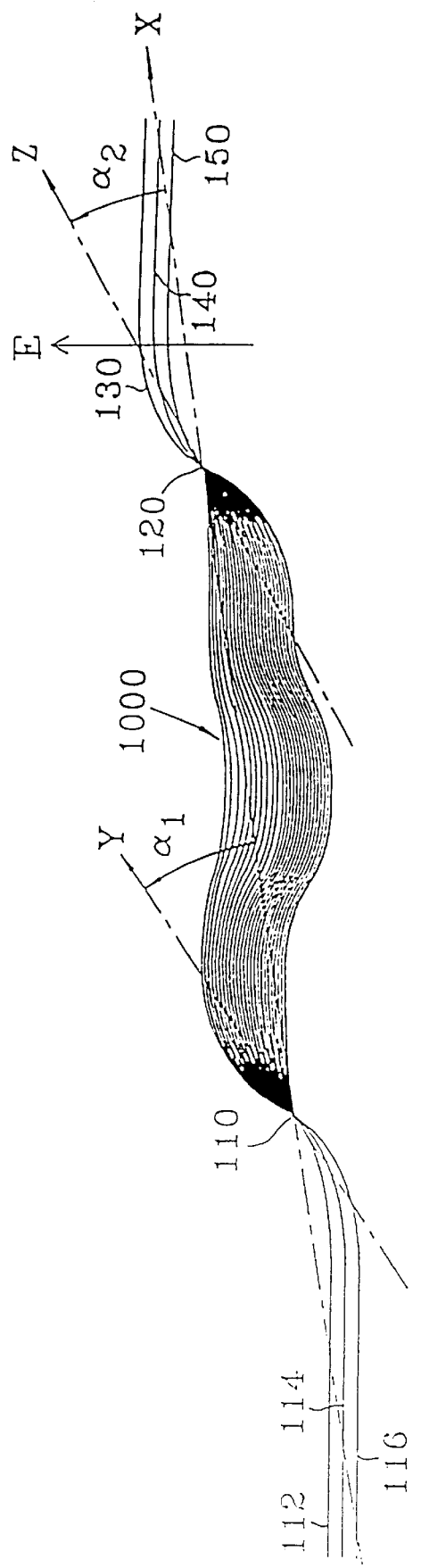
FIG. 11 is a side view of a phasar having its array of waveguides organized in accordance with the invention, in which the waveguides describe an additional central bend.

FIG. 11 shows a variant phasar 100 of the invention in which the waveguides of the array 1000 also present additional curvature in the central portion of the array. More precisely, in addition to a first bend in the vicinity of the coupler 110 and a bend in the vicinity of the second coupler 120, each waveguide presents an additional bend in the central portion of the array, said bend having the same direction of curvature for each waveguide in the array 1000.

In the disposition of FIG. 11, the waveguides of the array 1000 emerge from each of the two couplers 110 and 120 and spread apart from one another to a zone situated approximately one-third of the way along each of the waveguides.

In the central bend, the curvature of the waveguides increases the closer they are to the outside of the central bend. Thus, the longest waveguides of the array are the waveguides on the outside of the central bend.

The dispositions described above make it possible to adopt a large number of waveguides in the array, with the difference in length between waveguides being small, e.g. 3.2 μm. This makes it possible to obtain crosstalk of very good quality between two outlet channels.

In the phasars that have been proposed in the past, use has been made of low interference orders, e.g. order 2, in order to obtain satisfactory crosstalk. Such systems do not enable two channels to be separated when their wavelengths are close together, e.g. channels at 1.28 μm and 1.32 μm, since with low orders, the outlet channels have wavelength bandwidths that are particularly large, typically 100 nm at 5 dB.

In the case shown in FIG. 11, as in that of FIG. 10, for a selected waveguide of the array 1000, a short first bend near the coupler 110 compensates a long bend near the coupler 120, or conversely a long bend near the coupler 110 compensates a short bend near the coupler 120. This type of layout makes it possible to dispose a large number of waveguides in the array without overlap between the waveguides, e.g. 44 waveguides.

FIG. 11 also shows an arrow E indicating the direction of increasing wavelength conveyed by the channels 130, 140, and 150. The wavelength conveyed by an outlet channel increases the nearer said channel is situated to the inside of the central bend in the array 1000.

In FIGS. 10 and 11, the array 1000 has a length of 4000 μm measured between the two couplers 110 and 120.

The transverse dimensions of the arrays in the systems of those two figures is equal to 900 μm.

Figure 12:
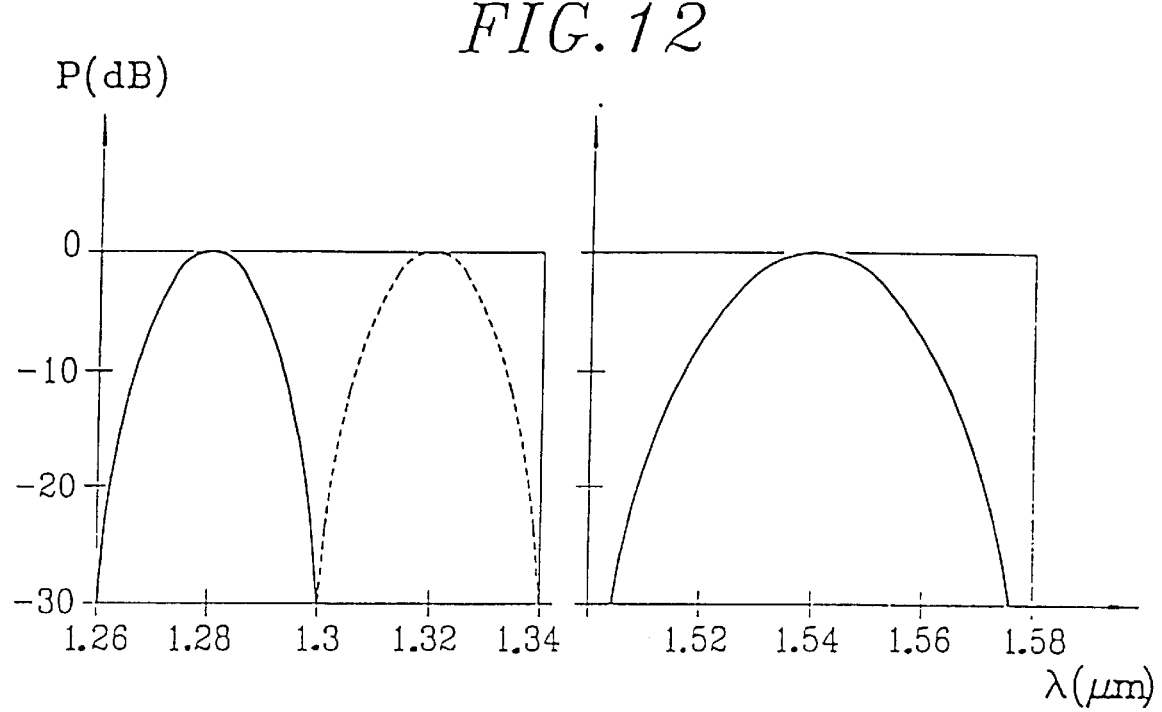
FIG. 12 is a plot of power transmitted by the outlet channels of a phasar of the invention as a function of wavelength.

FIG. 12 shows the power levels P detected on the outlet channels of the outlet coupler for the second variant of the invention described with reference to FIGS. 7 to 9. FIG. 12 is a graph with wavelength λ plotted along the abscissa in μm and power P as delivered downstream from the phasar plotted up the ordinate in dB.

As can be seen in FIG. 12, the 3 dB width of the spectrum line for the channels at 1.28 μm and 1.32 μm is 12 nm and for the two channels at 1.51 μm and at 1.55 μm, the 3 dB width of the same spectrum line is 21 nm. This spectrum line is made up of two lines that are close enough together to show no separation between them.

The phasar 100 of the invention presents dependence on light polarization of less than 2.5 nm on each channel.

Figure 13:
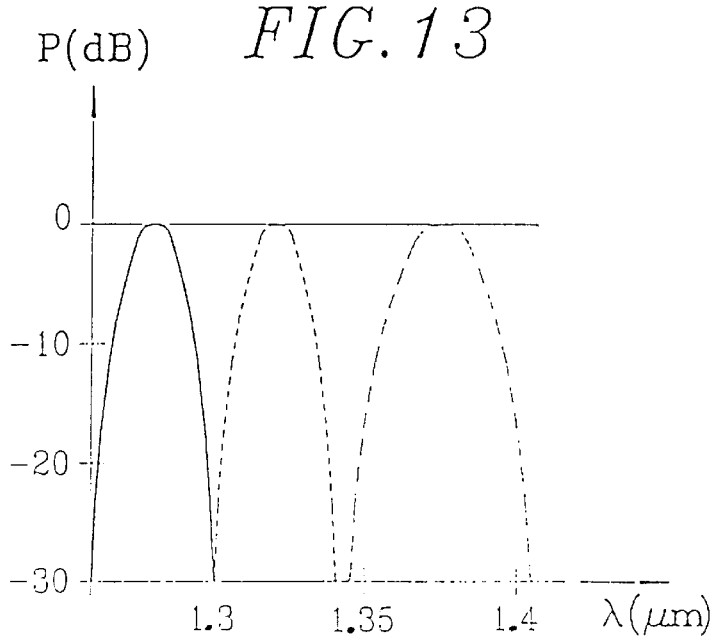
FIG. 13 is a plot similar to FIG. 12 in which the various portions of the plot, each corresponding to a single outlet channel, are brought together to make the plot easier to visualize.

FIG. 13 is also a graph showing how the power P detected on the outlet channels of the phasar of FIGS. 7 to 9 varies as a function of wavelength λ.

FIG. 13 differs from FIG. 12 in that a portion of the curve corresponding to the power detected on the channels 180 and 190 is offset by one free spectrum interval to make comparison easier with the two curves representing the powers detected on the channels 160 and 170.

Figure 14:
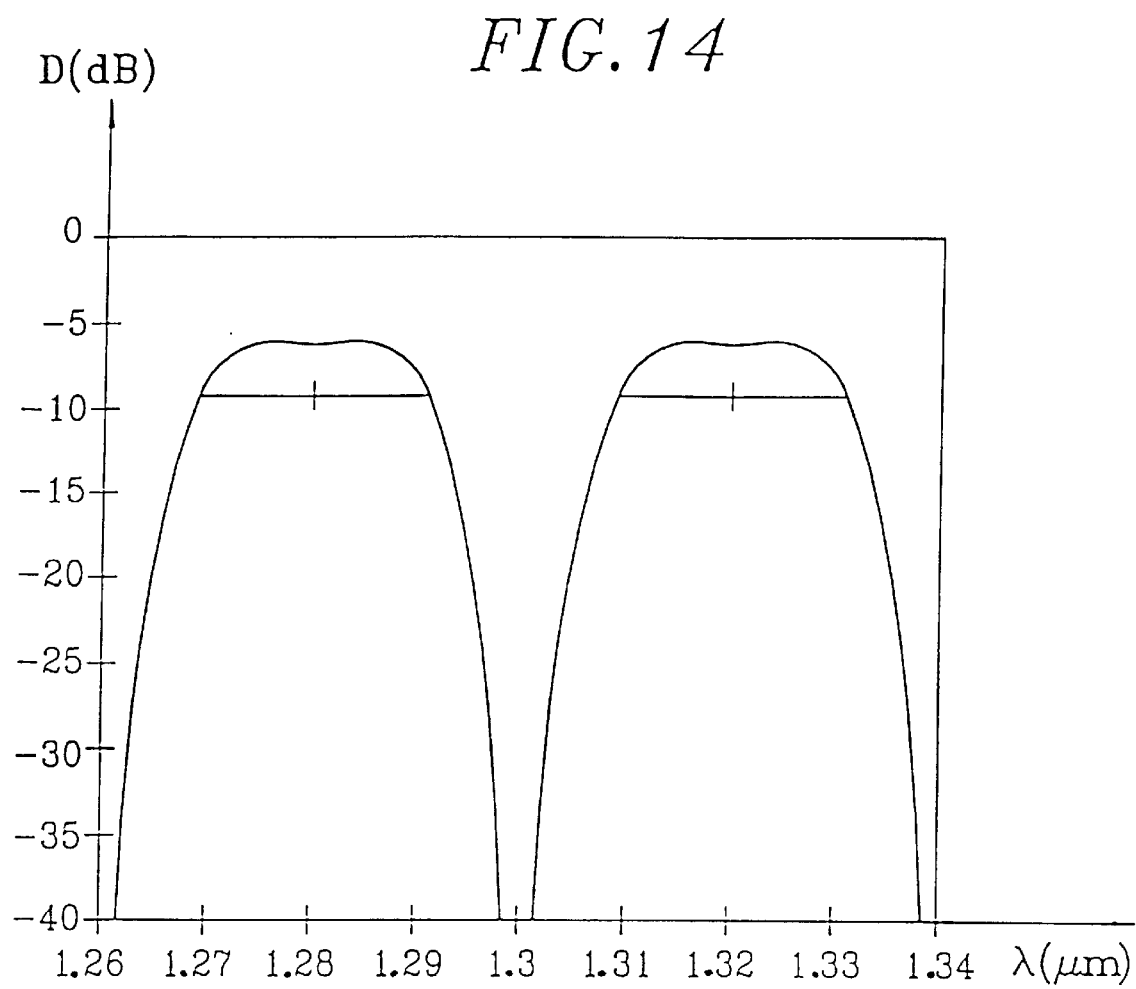
FIG. 14 is a plot of crosstalk obtained with a phasar of the invention, as a function of wavelength.

FIG. 14 shows the crosstalk indB as a function of wavelength λ. This crosstalk is better than −20 dB.

Figure 15:
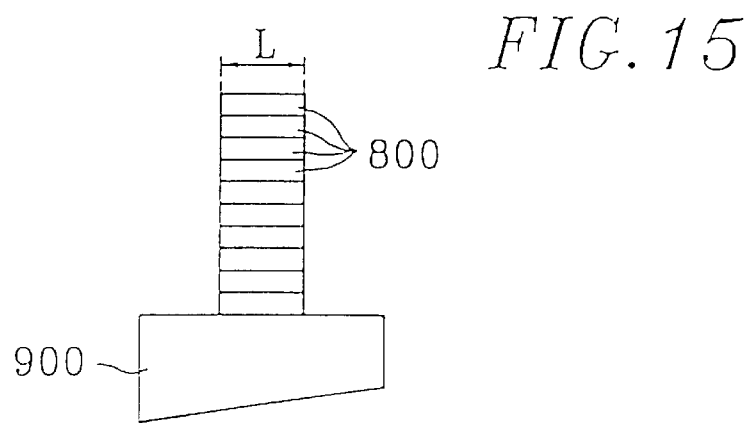
FIG. 15 is a cross-section view through an epitaxial structure for the array of the invention.

With reference to FIG. 15, there follows a description of how an epitaxial layer structure can be used to make the system. The structure is made on a semi-insulating InP substrate 900 by epitaxially depositing identical assemblies 800 several times one on another. Each assembly comprises two layers, an InP layer having a thickness of 500 Å and an InGaAsP layer having a thickness of 500 Å and a forbidden band wavelength of 1.17 μm. This two-layer assembly 800 is repeated ten times, for example. Once the stack has been made, reactive ion etching is performed from a top layer of the stack down to the substrate 900 so as to give the stack, when seen from above, the form of a strip of width L equal to 2 μm in this example. In FIG. 15, each set of two layers, one of InP and the other of InGaAsP is represented by a single rectangle 800.

The structure of these layers is selected so as to be capable of guiding lightwaves, both at a wavelength of 1.3 μm and at a wavelength of 1.5 μm. These layers are also of a structure that enables them to behave in the same manner at these wavelengths, regardless of the polarization of the light.

A strip of the kind shown in FIG. 15 is made by performing a single operation of reactive ion etching through the layers, based on a mixture of methane and of hydrogen.

For any selected difference in length between waveguides, which difference may be as small as desired, the difference in length can be obtained by giving the waveguides, each constituted by a stack as shown in FIG. 15, for example, appropriate additional curvature in the central portion of the array. Such a method of manufacture makes it possible to obtain differences of length between consecutive waveguides that are particularly small, and that are impossible to obtain with previously known methods.

The phasar of the invention can be made by implementing methods for compensating polarization, i.e. methods making it possible to reduce or make negligible any separation between the TE and TM modes, which separation is conventional 2.5 nm.

One such method is described in French patent application FR 95/04031. That method requires two layer structures of different birefringences.

It is also possible to make a phasar having an enlarged wavelength response. Such a phasar can thus be made in the context of the invention by applying the dispositions described in French patent application FR 96/11601.

A greater wavelength response width obtains greater tolerance both to temperature variations and to polarization. It is possible to obtain window widths of greater than 22 nm at 3 dB for the window at 1.3 μm and greater than 38 nm at 3 dB for the window at 1.54 μm. These widths are nearly twice the widths obtained with conventional demultiplexers.

It is advantageous to have large spectrum response width, in particular to cover the entire window at 1.54 μm, i.e. wavelengths covering the range 1.52 μm to 1.56 μm. With two channels, one at 1.535 μm and the other at 1.55 μm, such a window going from 1.52 μm to 1.56 μm is completely covered.

What is claimed is:

1. A system for interchanging optical signals over an optical fiber, the system comprising an optical component constituting a spectrograph having an array of waveguides extending between two couplers, and channels extending from the couplers to the outside of the component, said system also comprising an optical signal emitter and an optical signal receiver, a channel of one of the couplers of the optical component being connected to the optical fiber, a first channel and a second channel of the other coupler of the optical component being respectively connected to an inlet of the receiver and to an outlet of the emitter, wherein said other coupler has a third channel connected to a port of another optical component of the system.

2. A system according to claim 1, wherein the third channel is connected to an inlet of a second receiver.

3. A system according to claim 1, wherein the third channel is connected to an outlet of a second emitter.

4. A system according to claim 1, wherein the array spectrograph optical component is suitable for interchanging optical signals at wavelengths equal to 1.28 μm and 1.32 μm with the receiver and with the emitter connected respectively to the first channel and to the second channel, and for interchanging optical signals at wavelengths lying in the range of 1.52 μm to 1.56 μm with the other optical component.

5. A system according to claim 1, wherein the receiver and the emitter connected respectively to the first channel and to the second channel belong to a both-way communications terminal.

6. A system according to claim 1, wherein the array spectrograph optical component and the other optical component are suitable for interchanging a signal made up of a plurality of signals at different wavelengths.

7. A system according to claim 1, wherein the array spectrograph optical component is connected to one of the receivers or to one of the emitters by two channels, said two channels being disposed in such a manner as to be capable of conveying two wavelength ranges that do not leave a gap between them.

8. A system according to claim 1, wherein the array spectrograph optical component has a distribution of length for the waveguides of its array selected in such a manner that two free spectrum ranges of different center wavelengths are to be found in said other coupler.

9. A system according to claim 8, wherein the center wavelengths are selected to be sufficiently close to the wavelengths emitted or received by the emitters and the receivers such that the channels connecting said emitters and said receivers to said other coupler are grouped together in a central portion of said other coupler.

10. A system according to claim 1, wherein the array of waveguides has a length difference between waveguides that is constant over at least a portion of the array and that is selected so as to obtain two interference orders in said other coupler.

11. A system according to claim 1, wherein the array spectrograph optical component has a first directed mean direction of departure for the waveguides of the array from said one of the couplers, and a second directed mean direction of arrival for the waveguides of the array on said other coupler, a general axis being defined as an axis passing via the centers of each of the couplers, and for which a single positive direction is defined, the first and second directed directions each having a directed angle measured algebraically from said directed general axis that is of the same sign.

12. A system according to claim 11, wherein the oriented angles measured algebraically from said oriented general axis of the first and second directions have the same value.

13. A system according to claim 11, wherein the waveguides describe a first bend having a first direction of curvature on departure from one of said couplers and a last bend on arrival at the other coupler, said last bend having a direction of curvature opposite to said first direction of curvature, and the waveguides having an additional bend between said first and last bends.

* * * * *

UNITED STATES PATENT AND TRADEMARK OFFICE
CERTIFICATE OF CORRECTION

PATENT NO. : 6,377,379 B1
DATED : April 23, 2002
INVENTOR(S) : Bruno et al.

It is certified that error appears in the above-identified patent and that said Letters Patent is hereby corrected as shown below:

<u>Title page,</u>
Item [75], Inventors, please delete "Maisons Alfort" and "Bagneux" and insert
-- Acigne -- and Guignen -- respectively.

Signed and Sealed this

Thirteenth Day of July, 2004

JON W. DUDAS
*Acting Director of the United States Patent and Trademark Office*